US012698094B2

(12) United States Patent
Caruso et al.

(10) Patent No.: US 12,698,094 B2
(45) Date of Patent: Aug. 4, 2026

(54) INCEPTOR ASSEMBLY

(71) Applicant: Archer Aviation Inc., San Jose, CA (US)

(72) Inventors: Alberto Caruso, Gaunting (DE); Markus Stephan, Gaunting (DE); Johannes Ketisch, Gaunting (DE)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/666,808

(22) Filed: May 16, 2024

(65) Prior Publication Data

US 2024/0383607 A1 Nov. 21, 2024

(30) Foreign Application Priority Data

May 17, 2023 (EP) ..................................... 23173951

(51) Int. Cl.
B64D 11/00 (2006.01)
B64C 13/04 (2006.01)
B64D 43/00 (2006.01)

(52) U.S. Cl.
CPC .......... B64D 43/00 (2013.01); B64C 13/0421 (2018.01)

(58) Field of Classification Search
CPC . G05G 9/047; G05G 1/58; G05G 1/62; B64D 43/00; B64C 13/0421; E02F 9/2004
See application file for complete search history.

(56) References Cited

U.S. PATENT DOCUMENTS

| | | | | |
|---|---|---|---|---|
| 3,936,015 | A | * | 2/1976 | Dean ....................... B64C 27/56 244/234 |
| 4,012,014 | A | | 3/1977 | Marshal |
| 4,763,860 | A | | 8/1988 | Vauvelle et al. |
| 6,564,896 | B1 | * | 5/2003 | Proksch .................. E02F 9/166 180/326 |
| 8,146,999 | B2 | | 4/2012 | Ferguson et al. |
| 8,398,023 | B2 | | 3/2013 | Nunez et al. |
| 10,829,202 | B2 | | 11/2020 | Haugeberg |
| 2006/0232116 | A1 | | 10/2006 | Jang |
| 2009/0283644 | A1 | | 11/2009 | Haverdings |
| 2011/0025108 | A1 | * | 2/2011 | Wihinen ................ B60N 2/797 74/471 XY |
| 2012/0234985 | A1 | | 9/2012 | Biest et al. |
| 2014/0061388 | A1 | | 3/2014 | Bandera |
| 2014/0138492 | A1 | | 5/2014 | Van Staagen |
| 2018/0058037 | A1 | | 3/2018 | Muramoto et al. |

(Continued)

FOREIGN PATENT DOCUMENTS

| | | | | |
|---|---|---|---|---|
| EP | 0086523 | A1 * | 8/1983 | ............. B60N 2/797 |
| EP | 2119626 | B1 | 8/2011 | |

(Continued)

*Primary Examiner* — Joshua D Huson
*Assistant Examiner* — Vicente Rodriguez
(74) *Attorney, Agent, or Firm* — Finnegan, Henderson, Farabow, Garrett & Dunner, LLP

(57) ABSTRACT

An inceptor assembly for an aircraft includes a support structure, an armrest being attached to the support structure, and an inceptor being attached to the support structure or the armrest. The inceptor, the support structure and/or the armrest are adjustable to adjust at least from a stored position to an elevated position on an elevating path and from the elevated position to the stored position on a stowing path.

14 Claims, 3 Drawing Sheets

(56)        References Cited

U.S. PATENT DOCUMENTS

| 2019/0112030 | A1 | 4/2019 | Miller |
| 2019/0263504 | A1 | 8/2019 | Lavallee et al. |
| 2022/0041267 | A1 | 2/2022 | De Freitas et al. |
| 2022/0363396 | A1 | 11/2022 | Rowe et al. |

FOREIGN PATENT DOCUMENTS

| EP | 3258017 | B1 | | 9/2020 | |
| GB | 2224559 | A | * | 5/1990 | .............. E02F 3/325 |
| JP | H1136368 | A | * | 2/1999 | |
| JP | 4997562 | B2 | | 8/2012 | |
| WO | WO-2009010818 | A2 | * | 1/2009 | .............. B60N 2/24 |

* cited by examiner

INCEPTOR ASSEMBLY

The present disclosure relates to an inceptor assembly for an aircraft. Such inceptor assemblies comprise a support structure, an armrest being attached to the support structure, and an inceptor being attached to the support structure or the armrest.

BACKGROUND

With the recent advancement in personal aircraft technology, especially electric vertical take-off and landing vehicles (eVOTL), the need for even more improved and refined structures aboard the aircraft has become more imminent. Especially the space in the cockpit has been reworked to accommodate the needs of a singular pilot accessing the cockpit through a side walk next to a single pilot's seat. Therefore, there are conflicting requirements between the need of removing obstructing objects and the necessity of having pilot access to an inceptor for operating the aircraft. In the prior art, adjustable aircraft flight controllers are known, for example as published in U.S. Pat. No. 4,012, 014A. Herein, the armrest including the inceptor is height adjustable next to the pilot's seat, however cannot be removed in a way to enable entry and exit to and from the pilot's seat. Further, a movable armrest with an inceptor has been suggested in US2014138492A1. This armrest includes the inceptor and may be pivoted upwards around a pivot axis located in the backrest of the seat when not needed. However, the armrest and the inceptor are still in the way when accessing or exiting the pilot's seat.

None of these solutions allows for an unobstructed path next to a pilot's seat for entry and exit of the pilot out of the aircraft cockpit. Further, these examples of the prior art still require a relatively large amount of space in the cockpit.

SUMMARY

An object of the present disclosure is thus to achieve an improved space utility of the aircraft cockpit, especially at an entrance and exit path in a one-seat-cockpit.

The present disclosure relates to an inceptor assembly for an aircraft including a support structure and an inceptor being attached to the adjustable support structure or the armrest.

To improve the space utility of the aircraft cockpit, the inceptor and/or the support structure are adjustable to adjust at least from a stored position to an elevated position on an elevating path and from the elevated position to the stored position on a stowing path. In the stored position, the inceptor is stored in a lower area of the cockpit that allows the pilot to enter or leave the cockpit unobstructed. In the elevated position the inceptor, including the flight stick, is in reach of the pilot for controlling the aircraft in a comfortable manner. In more detail, the inceptor comprises a flight stick and a flight stick housing supporting the attached flight stick and holding a flight stick motor and/or a flight stick actuator and housing the electronic components as well as any electronic connections for signal wires and electric wires to and from the flight stick. The inceptor assembly may further include an armrest being attached to the adjustable support structure. The armrest may also be adjustable to adjust at least from the stored position to the elevated position on the elevating path and from the elevated position to the stored position on a stowing path. In the elevated position, the pilot may comfortably control the aircraft by resting the arm on the armrest. The base section may be located at least partially within the armrest or the support structure. Especially, the flight stick housing of the inceptor may be located within a forward part of the armrest that is separatable from a backward part of the armrest. The flight stick housing itself may have a hand rest that may have a surface that is aligned and arranged with the surface of the armrest. Moreover, the inceptor, the armrest and the support structure may be rotated and/or translated independently.

Advantageous embodiments are defined in the dependent claims. Note that the features mentioned in the introductory part of this description may individually or in any combination thereof also be provided in the presently disclosed solution, if not mentioned or evident otherwise.

In a further embodiment of the present disclosure, in the stored position, the inceptor and/or the support structure may be located in a stowing compartment. A stowing compartment advantageously protects the inceptor assembly and its components. The stowing compartment may be fixedly attached to a cockpit floor. The stowing compartment may comprise side walls that cover the support structure, the armrest and/or the inceptor at least in the stored position from the sides in a transverse direction. The stowing compartment may comprise a lid that covers the inceptor and/or the support structure in a stored position. The armrest may also be located in the stowing compartment in the stored position.

According to a further embodiment, the inceptor may be rotated at least 15° and at most 60°, preferably at least 20° and at most 55°, more preferably at least 25° and at most 50°, even more preferably at least 30° and at most 45° on the stowing path or on the elevating path.

In yet another embodiment, the inceptor, the support structure and/or an armrest, the armrest being attached to the adjustable support structure and/or the inceptor, may include a folding mechanism to set the support structure between the stored position and the elevated position. The folding mechanism may connect the inceptor, the support structure and/or the armrest. The folding mechanism may be a part of the inceptor, the support structure and/or the armrest. The folding mechanism may comprise one or more additional components to aid in a movement between the stored position and the elevated position. A folding mechanism advantageously allows for a precise and more complex stowing path or elevating path between the stored position and the elevated position.

Additionally, the folding mechanism may comprise a first pivot joint pivotably joining the support structure to a cockpit floor. This advantageously allows for a low stored position of the inceptor assembly at the cockpit floor. Additionally, this may allow for a secure fastening of the inceptor assembly to the aircraft cockpit and reduce vibrations during operation. The connection between the cockpit floor and the support structure may be designed as a floor bracket. The floor bracket may also have a holding reception for the stowing compartment. The floor bracket may also be located inside the stowing compartment and/or be covered at the sides by the stowing compartment.

Further, the support structure may be rotatable in a first rotation direction around the first pivot joint on the stowing path and/or the support structure may be rotatable in the first rotation direction or in a first counter rotation direction around the first pivot joint on the elevating path.

This advantageously allows for a reduction in space used by the inceptor assembly as the connected inceptor, armrest and/or support structure may fold in on each other or be arranged in a flat way in the stored position. The support structure may be, besides any for example joints or bolt, designed as a single piece structure. In this case, the support structure may be rotatable in the first rotation direction around the first pivot joint on the stowing path and in the first counter rotation direction around the first pivot joint on the elevating path. The support structure may be, besides any for example joints or bolts, designed as a multiple-components-structure. In this further case, at least one of the components of the support structure may be rotatable in the first rotation direction around the first pivot joint on the stowing path and the at least one of the components or another component of the support structure may also be rotated in the first rotation direction around the first pivot joint on the elevating path.

Further, in an embodiment the folding mechanism may comprise a second pivot joint pivotably joining the support structure and the armrest and/or the support structure and the inceptor, especially in that a flight stick of the inceptor and/or a base section of the inceptor is rotated around the second pivot joint and in that the support structure is rotated around the first pivot joint. This allows for an especially compact folding action of the inceptor assembly.

Furthermore, in another embodiment the armrest is rotatable in a second rotation direction and/or the inceptor is rotatable in a third rotation direction around the second pivot joint on the stowing path and/or that the armrest is rotatable in the second rotation direction and/or the inceptor is rotatable in the third rotation direction or the armrest is rotatable in a second counter rotation direction and/or the inceptor is rotatable in a third counter rotation direction on the elevating path. Advantageously, each of the armrest and the inceptor may be rotated around the second pivot joint to improve on the folding action of the inceptor assembly. Moreover, the armrest and the inceptor may be rotated in different directions to favourably reduce the size the inceptor assembly occupies in the stored position in contrast to the elevated position.

In an enhanced embodiment, the first rotation direction is opposite to the second rotation direction and/or the third rotation direction and/or the first counter rotation direction is opposite to the second counter rotation direction and/or the third counter rotation direction. This may advantageously further reduce the space occupied by the inceptor assembly in the stored position.

In yet another embodiment, the inceptor may be attached to the support structure in an area of the second pivot joint, especially in an area around the second pivot joint, preferably at a third pivot joint. Especially, the inceptor may be translationally movable attached to the support structure. The support structure might have an elongated hole in which pins and/or a rotational axis of the inceptor may be slidably arranged. Connecting the inceptor to the support structure in an area around of the second pivot joint allows for an eccentricity to better adapt the movement of the inceptor to the movement of the armrest and/or the support structure.

Moreover, in yet another aspect of the present disclosure, the folding mechanism may include a spring mechanism to pre-tension the support structure against the cockpit floor and/or the armrest against the support structure and/or the inceptor against the support structure in a direction of travel from the stored position to the elevated position and/or from the elevated position to the stored position. This advantageously aids the movement of the inceptor assembly between the two positions. The spring mechanism may comprise at least one spring and/or at least one tensioning device to pre-tension the inceptor arrangement. Alternatively or in addition, the folding mechanism may include at least an actuation device to move the support structure, the armrest and/or the inceptor from the elevated position to the stored position and/or from the stored position to the elevated position.

In another embodiment, that the spring mechanism includes a release mechanism to release the pre-tension by a release trigger, especially wherein the release trigger is a button, and preferably wherein the trigger is located on the armrest, on the inceptor or on the support structure. The release facility is an easy and convenient way to release the pre-tension in the spring mechanism to aid in the movement of the inceptor assembly. Further, a release facility may be advantageously used to synchronize the movement of the components of the inceptor assembly, especially when multiple springs and/or tensioning devices are used in the aid of the movement of the inceptor assembly.

Furthermore, the spring mechanism may release the pre-tension of the support structure against the cockpit floor and the pre-tension of the armrest against the support structure at the same time or in a predetermined order, preferably such that the release results in a single swoop of the folding mechanism, the inceptor, the support structure and the armrest along the stowing path and/or along the elevating path.

The present disclosure further relates to an aircraft cockpit for an aircraft comprising one pilot's seat and at least one inceptor assembly as described above, wherein the inceptor assembly may be positioned on the left and/or right side of the pilot's seat.

In a further embodiment of the aircraft cockpit the pilot's seat may be arranged on the centre line of the aircraft. Having an inceptor assembly as described above on the left or right side of pilot's seat arranged on the centre line solves the problem of reduced space inside a smaller aircraft, as the particular arrangement allows for the pilot to enter and leave the aircraft cockpit without obstruction.

Note that herein, the orientation of the subject matter is described in the three main axes of an aircraft, which corresponds to the three main axes of the aircraft cockpit. The longitudinal axis runs lengthwise through the centre of the aircraft from the nose to the tail. It is also known as the roll axis, and it is the axis around which the aircraft rolls. The transversal axis runs across the aircraft, perpendicular to the longitudinal axis. It is also known as the pitch or lateral axis, and it is the axis around which the aircraft pitches. The vertical axis runs vertically through the centre of the aircraft. It is also known as the yaw axis, and it is the axis around which the aircraft yaws.

BRIEF SUMMARY OF THE DRAWINGS

In the following, an embodiment of the present disclosure will be described with reference to the attached schematic figures. Features which correspond to one another with regard to their type and/or function may be assigned the same reference signs throughout the figures.

DETAILED DESCRIPTION

Figure 1:
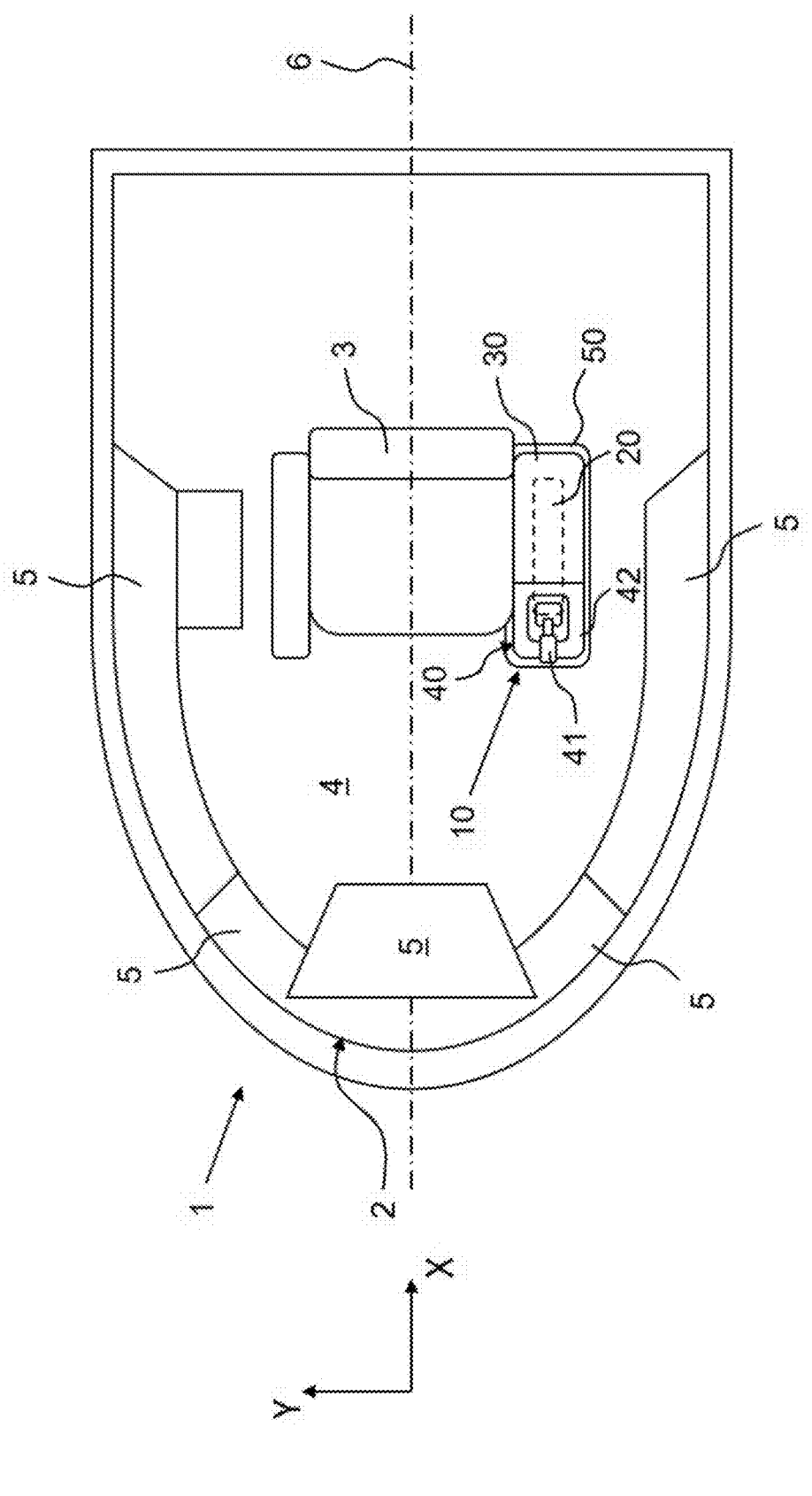
FIG. 1 shows a schematic illustration of an aircraft cockpit according to a first embodiment of the present disclosure.

In FIG. 1, a top view of an aircraft 1 with an aircraft cockpit 2 according to a first embodiment of the present disclosure is schematically shown. The aircraft cockpit's 2 longitudinal axis X and transversal axis Y are displayed on the left-hand side of the drawing.

The aircraft cockpit 2 comprises a single pilot's seat 3, a cockpit floor 4 and cockpit equipment 5 arranged in front of the pilot's seat 3. The pilot's seat 3 is arranged on a centre line 6 of the aircraft 1. On the left side of the pilot's seat 3 an inceptor assembly 10 is arranged such that the aircraft 1 can be controlled from the pilot's seat 3. The inceptor assembly 10 comprises a support structure 20, an armrest 30 and an inceptor 40 including a flight stick 41, a flight stick base 42 and a flight stick housing 43. Further, the inceptor assembly 10 is set in an elevated position. A stowing compartment 50 for the support structure 20, the armrest 30 and the inceptor 40 is arranged around a lower part of the inceptor assembly 10.

Figure 2:
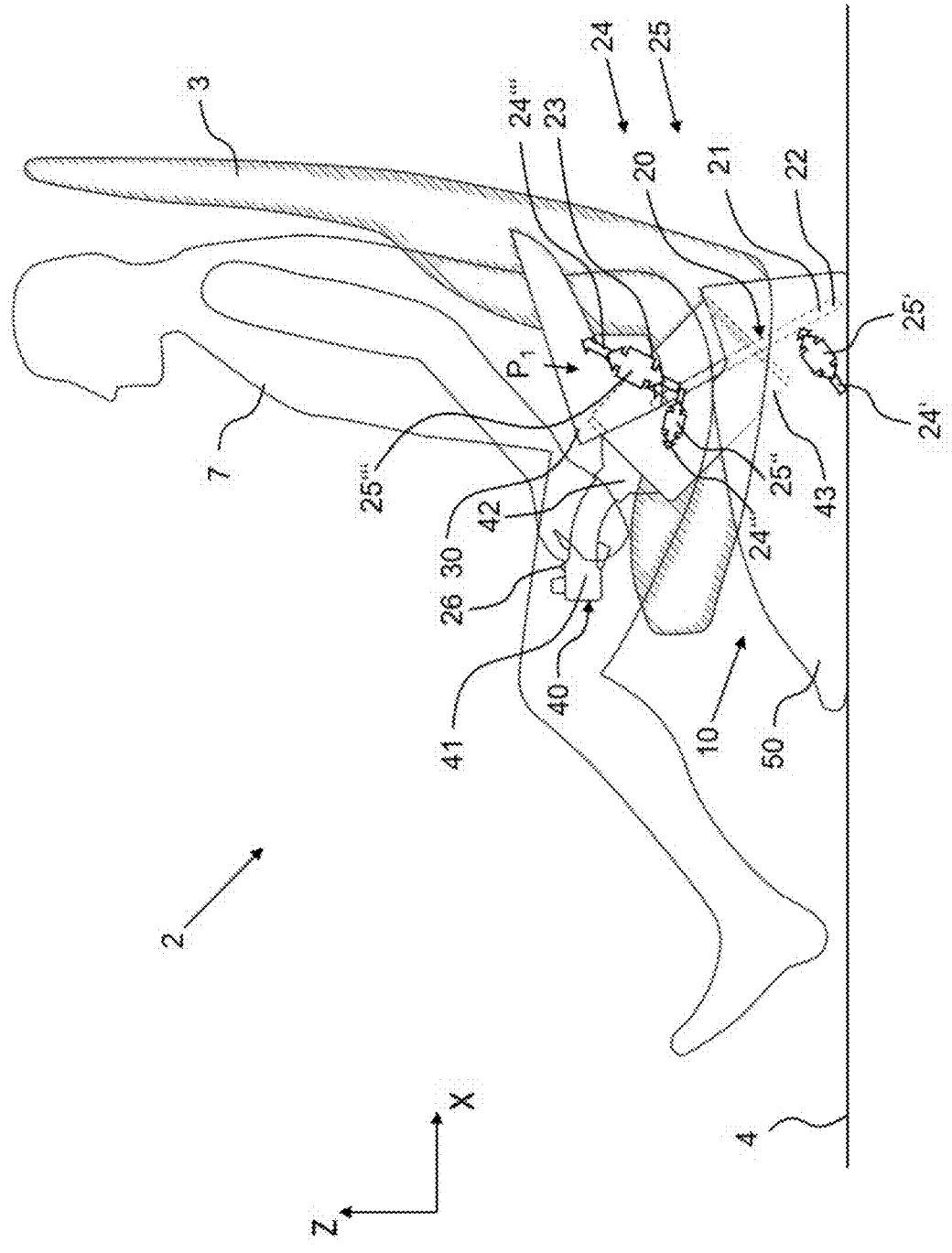
FIG. 2 shows a schematic illustration of an inceptor assembly according to a second embodiment of the present disclosure in an elevated position.
Figure 3:
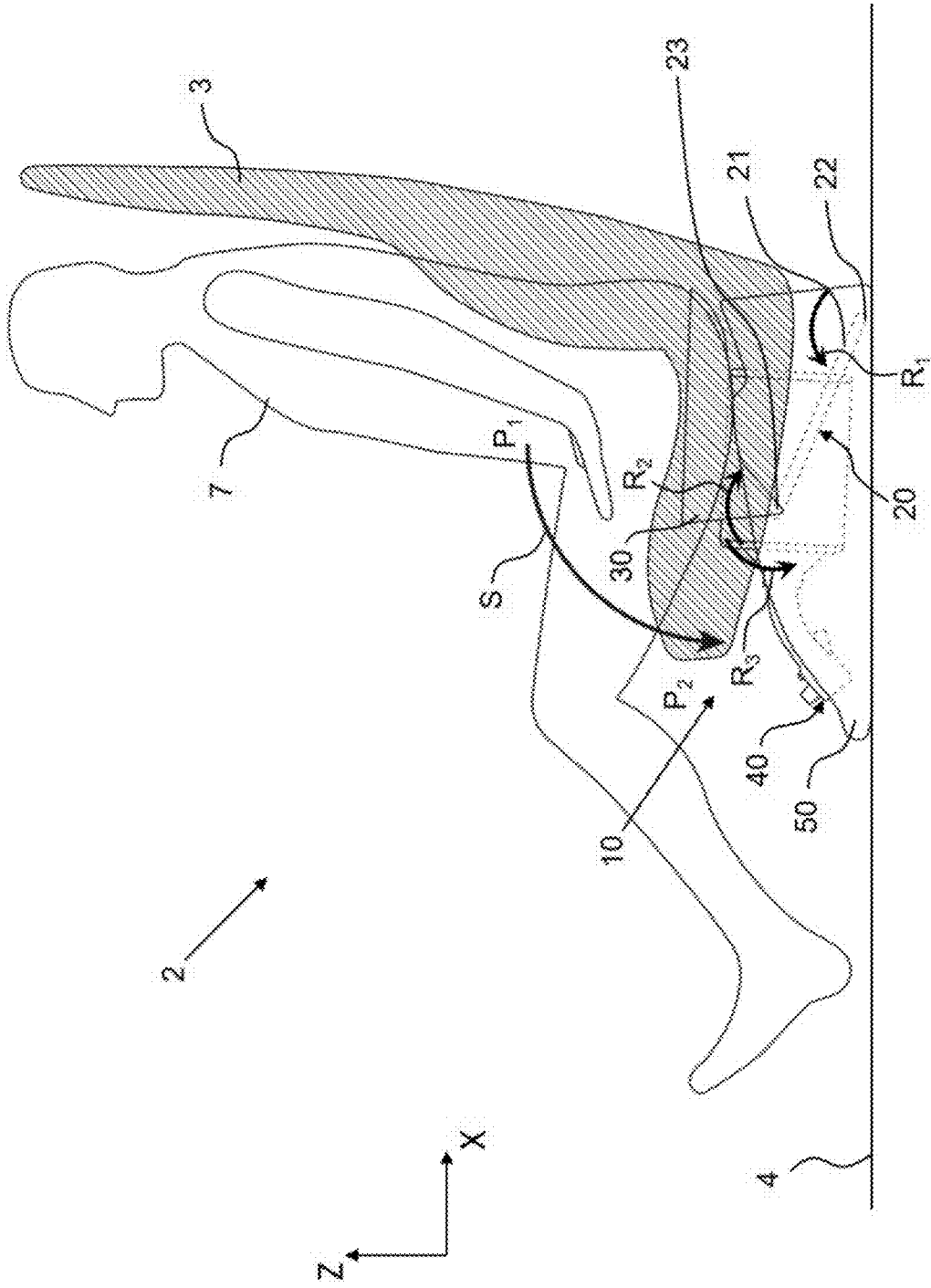
FIG. 3 shows a detailed view of the inceptor assembly according to the second embodiment of the present disclosure in a stored position.

The inceptor assembly 10 and the function of the inceptor assembly 10 are now described in more detail based on a second exemplary embodiments illustrated in FIGS. 2 and 3. It is a goal of the present disclosure, to allow the inceptor assembly 10 to move from an elevated position $P_1$ to a stored position $P_2$ in a single swoop on a swooping path S, to allow the pilot to enter and exit the pilot's seat 3 and the cockpit 1.

FIG. 2 and FIG. 3 each show a side view of the inceptor assembly 10 inside the cockpit 2. A pilot 7 is displayed sitting in the pilot's seat 3 to demonstrate the dimensions of the inceptor assembly 10 next to the pilot's seat 3. The aircraft cockpit's 2 longitudinal axis X and vertical axis Z are displayed on the left-hand side of the drawing.

As described above with regard to the embodiment shown in FIG. 1, the inceptor assembly 10 comprises a support structure 20, an armrest 30 and an inceptor 40, the inceptor 40 including a flight stick 41 being attached with a flight stick base 42 to a flight stick housing 43. Inside the flight stick housing 43, inceptor components such as electrical wires, electronic devices and stick motors and actuators are located.

To securely store the support structure 20 and the inceptor 40 in the stored position $P_2$, a stowing compartment 50 is arranged on the cockpit floor 4. The stowing compartment 50 may be designed with a lid for increased protection of the support structure 20 and the inceptor 40 in the stored position $P_2$.

In the elevated position $P_1$, the armrest 30 may be inclined with respect to the cockpit floor 4, having a forward end at a lower position and a backward end at a higher position. Further in the elevated position $P_1$, the inceptor 40 has a forward end of the flight stick 41 positioned at a heightened position such that the pilot 7 can conveniently operate the flight stick 41. Moreover, the flight stick 41, the flight stick base 42 and the flight stick housing 43 are tilted forward about a 45° angle with respect to the cockpit floor 4.

The support structure 20 includes a folding mechanism 21-23, wherein the folding mechanism 21-23 comprises a first pivot joint 21 located in a backward area of the inceptor assembly 10, a rotating lever 22 and a second pivot joint 23 located at an upper forward area of the inceptor assembly 10.

In this embodiment, the first pivot joint 21 is fixed to the cockpit floor 4, especially wherein a floor bracket may be located in a backward area of the stowing compartment 50 to fix the first pivot joint 21 to the cockpit floor 4. In an alternative embodiment, the first pivot joint 21 may also be attached to the cockpit floor 4 for a sliding movement. The first pivot joint 21 may be designed as a single axis rotatably attached to the cockpit floor 4 through two or more brackets or it may be designed as one or more hinge joints distributed across the width of the support structure 20 of the inceptor assembly 10.

The rotating lever 22 connects the second pivot joint 23 to the first pivot joint 21 in a rotating manner and is arranged in an upper position when the inceptor arrangement 10 is in the elevated position $P_1$ and arranged in a lower position when the inceptor arrangement 10 is in the stored position $P_2$. The rotating lever 22 pivots around the first pivot joint 21 in a counter-clockwise, first rotation direction $R_1$ when the inceptor arrangement 10 is moving from the elevated position $P_1$ to the stored position $P_2$ on the stowing path, allowing the rotating lever 22 of the support structure 20 to fold onto the cockpit floor 4. In the displayed embodiment, the rotating lever 22 is fixed in its length, but may also be designed as extendable in its length, for example, as a telescopic arm. Further, the rotating lever 22 may be designed as a two-segment arm, having two separate segments, wherein the two segments are hinged together and can rotate around each other to assist in a more confined motion of the inceptor assembly 40.

The second pivot joint 23 is arranged at a pivoting second end of the rotating lever 22. The armrest 30 and the inceptor 40 are attached to the support structure 20 at the second pivot joint 23, wherein each being able to pivot individually around the second pivot joint 23. In this embodiment, the armrest 30 and the inceptor 40 are rotatable in opposite directions. In an alternative embodiment, the armrest 30 and the inceptor 40 may be pivotable around the second pivot joint 23 in the same direction. The armrest 30 is rotatable in a clockwise, second rotation direction $R_2$, around the second pivot joint 23, enabling the armrest 30 and the rotating lever 22 of the support structure 20 to fold in on each other. The inceptor 40 is rotatable in a counter-clockwise, third rotation direction $R_3$ around the second pivot joint 23, allowing for an advantageous additional eccentric angular movement around the first pivot joint 21 to level the inceptor 40 in the stored position $P_2$.

In the stored position $P_2$, the armrest 30 and the inceptor 40, especially the flight stick 41 at the flight stick base 42 and the flight stick housing 43, are arranged almost horizontally and thus, almost parallel to the cockpit floor 4, i.e. less than a 10° angle to the cockpit floor. More specifically, the flight stick 41 at the flight stick base 42 and the flight stick housing 43 are tilted forward about a 7° angle with respect to the cockpit floor 4. Thus, in this particular embodiment, the inceptor 40 is rotated about 38° on the stowing path or on the elevating path.

In this stored position $P_2$, the armrest 30 may serve as at least a partial and backward lid for the stowing compartment 50.

To assist the movement of the inceptor assembly 10 between the elevated position $P_1$ and the stored position $P_2$, the folding mechanism 21-23 includes a spring mechanism 24 to pre-tension the support structure 20 against the cockpit floor 4 and the armrest 30 against the support structure 20 and the inceptor 40 against the support structure 20 in both directions of travel, namely in a first direction of travel from the elevated position to the stored position and in a second direction of travel from the stored position to the elevated position.

The spring mechanism 24 comprises a first spring device 24' to pre-tension the rotating lever 22 against the cockpit floor 4 in the first direction of travel. Further, the spring mechanism 24 comprises a second spring device 24" to pre-tension the armrest 30 against the rotating lever 22 in the first direction of travel. Finally, the spring mechanism 24 comprises a third spring device 24''' to pre-tension the inceptor 40 also against the rotating lever 22 in the first direction of travel.

To release the pre-tension, the spring mechanism 24 includes a release facility 25 to release the pre-tension by a trigger 26 that is designed as a button located on the flight stick next to other control elements. The release facility 25 includes a first release device 25' for releasing the pre-tension of the first spring device 24', a second release device 25" for releasing the pre-tension of the second spring device 24" and a third release device 25''' for releasing the pre-tension of the third spring device 24'''. Upon triggering, the button 26 sends a signal to a first release device 25' to release the pre-tensioned first spring device 25'. Shortly after the second release device 25" and the third release device 25''' are triggered by the signal to release the pre-tensions of the second and third spring devices 24", 24'''. Thus, the inceptor assembly 10 swoops from the elevated position P$_1$ to the stored position P$_2$ in a single swoop.

REFERENCE SIGNS LIST 1 aircraft
2 aircraft cockpit
3 pilot's seat
4 cockpit floor
5 cockpit equipment
6 centre axis
7 pilot
10 inceptor assembly
20 support structure
21 first pivotal connection
22 rotating lever
23 second pivotal connection
24 spring mechanism
24' first spring device
24" second spring device
24''' third spring device
25 release mechanism
25' first release device
25" second release device
25''' third release device
26 release trigger
30 armrest
40 inceptor
41 flight stick
42 flight stick base
43 flight stick housing
50 stowing compartment
P$_1$ elevated position
P$_2$ stored position
R$_1$ first rotation direction
R$_2$ second rotation direction
R$_3$ third rotation direction
X longitudinal direction/axis
Y transversal direction/axis
Z vertical direction/axis

What is claimed is:

1. An inceptor assembly for an aircraft with an aircraft cockpit comprising:
a cockpit floor;
a stowing compartment being arranged on the cockpit floor;
a support structure;
an inceptor being attached to the support structure; and
an armrest being attached to the support structure; wherein the inceptor, the armrest, and the support structure are adjustable between a stowed position and an elevated position along an elevating path and along a stowing path, respectively; wherein the support structure and the inceptor are both enclosed inside the stowing compartment in the stowed position; and the armrest is configured to fold in on top of the support structure and to serve as a partial backward lid for the stowing compartment when in the stowed position; and wherein the support structure includes a folding mechanism configured to set the support structure, the inceptor, and the armrest between the stowed position and the elevated position;

the folding mechanism includes a spring mechanism to pre-tension the support structure against the cockpit floor and pre-tension the armrest against the support structure; wherein the spring mechanism includes a release mechanism; and wherein the release mechanism is configured to release the pre-tension of the support structure against the cockpit floor and the pre-tension of the armrest against the support structure at a same time or in a predetermined order, such that the release results in a single swoop of the folding mechanism, the inceptor, the support structure, and the armrest along the stowing path and/or along the elevating path.

2. The inceptor assembly according to claim 1 wherein the folding mechanism comprises a first pivot joint pivotably joining the support structure to the cockpit floor.

3. The inceptor assembly according to claim 2, wherein the support structure is rotatable in a first rotation direction around the first pivot joint on the stowing path, and/or wherein the support structure is rotatable in a first counter rotation direction around the first pivot joint on the elevating path.

4. The inceptor assembly according to claim 3, wherein the folding mechanism comprises a second pivot joint pivotably joining the support structure and the armrest, and/or the support structure and the inceptor.

5. The inceptor assembly according to claim 4, wherein the armrest is rotatable about a second rotation direction corresponding to a clockwise direction on the stowing path and/or the inceptor is rotatable about a third rotation direction corresponding to a counterclockwise direction around the second pivot joint on the stowing path, and/or wherein the armrest is rotatable about the second counter rotation direction corresponding to a counterclockwise direction and/or the inceptor is rotatable about the third rotation direction corresponding to a clockwise direction about the second pivot joint on the elevation path.

6. The inceptor assembly according to claim 5 wherein the armrest and the inceptor are configured to always rotate about the second pivot joint in opposite directions along the stowing path and the elevation path.

7. The inceptor assembly according to claim 4, wherein the inceptor is attached to the support structure in an area of the second pivot joint.

8. The inceptor assembly according to claim 1, wherein the inceptor is rotated at least 15° and at most 60° on a stowing path or on the elevating path.

9. The inceptor assembly according to claim 2, wherein the folding mechanism includes a spring mechanism to pre-tension the support structure against the cockpit floor and/or the armrest against the support structure and/or the inceptor against the support structure in a direction of travel from the stowed position to the elevated position and/or from the elevated position to the stowed position.

10. An aircraft cockpit for an aircraft comprising: one pilot's seat; and at least one inceptor assembly according to claim 1, positioned on a left and/or a right side of the pilot's seat.

11. An aircraft cockpit according to claim 10, wherein the pilot's seat is arranged on a center line of the aircraft.

12. An inceptor assembly for an aircraft with an aircraft cockpit, comprising:

a support structure;

an inceptor being attached to the support structure;

an armrest being attached to the support structure; and a stowing compartment being arranged on a cockpit floor; wherein the inceptor, the armrest and the support structure are adjustable between a stowed position and an elevated position along an elevating path and a stowing path, respectively; wherein the support structure and the inceptor are both enclosed inside the stowing compartment in the stowed position; and the armrest is configured to fold in on top of the support structure and to serve as a partial backward lid for the stowing compartment when in the stowed position; and wherein the support structure includes a folding mechanism to set the support structure, the inceptor, and the armrest between the stowed position and the elevated position;

the stowing compartment comprises a lid; and wherein in the stowed position, at least the inceptor being arranged in the stowing compartment and being at least partially covered by the lid.

13. An aircraft cockpit for an aircraft comprising: one pilot's seat; and at least one inceptor assembly according to claim 12, positioned on a left and/or a right side of the pilot's seat.

14. An aircraft cockpit according to claim 13, wherein the pilot's seat is arranged on a center line of the aircraft.

* * * * *